(12) United States Patent
Müller et al.

(10) Patent No.: US 9,322,191 B2
(45) Date of Patent: Apr. 26, 2016

(54) GRIP DEVICE, IN PARTICULAR FOR A VEHICLE

(75) Inventors: Dirk Müller, Essen (DE); Andreas Beck, Bochum (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 196 days.

(21) Appl. No.: 13/697,525

(22) PCT Filed: May 10, 2011

(86) PCT No.: PCT/EP2011/057562
§ 371 (c)(1),
(2), (4) Date: Jan. 25, 2013

(87) PCT Pub. No.: WO2011/141485
PCT Pub. Date: Nov. 17, 2011

(65) Prior Publication Data
US 2013/0121008 A1    May 16, 2013

(30) Foreign Application Priority Data

May 10, 2010 (DE) .......................... 10 2010 016 869

(51) Int. Cl.
*E05B 3/00* (2006.01)
*E05B 5/02* (2006.01)
(Continued)

(52) U.S. Cl.
CPC . *E05B 5/003* (2013.01); *B60Q 1/26* (2013.01); *E05B 85/107* (2013.01); *Y10T 292/57* (2015.04)

(58) Field of Classification Search
CPC ..... E05B 5/003; E05B 85/107; Y10T 292/57; B60Q 1/26; Y10S 292/31
USPC .......... 292/336.3, DIG. 22, DIG. 65, DIG. 31
See application file for complete search history.

(56) References Cited

U.S. PATENT DOCUMENTS 2,599,054 A * 6/1952 Gates ...................... E05B 5/003
                                                           292/348
5,123,687 A * 6/1992 Pfeiffer et al. ............. 292/336.3
(Continued)

FOREIGN PATENT DOCUMENTS

DE          3427178 A1 * 2/1986
DE          4002963        7/1991
(Continued)

OTHER PUBLICATIONS

International Search Report, mailing date Aug. 31, 2011, for corresponding International Application No. PCT/EP2011/057562.
(Continued)

*Primary Examiner* — Kristina Fulton
*Assistant Examiner* — Christine M Mills
(74) *Attorney, Agent, or Firm* — Intellectual Property Law Group LLP

(57) ABSTRACT

The invention relates to a grip device (10) for a closure device (80) for a movable part (70), such as a door, lid or the like, of a vehicle, comprising a grip part (20), which is movably mounted relative to the movable part (70), wherein the closure device can be connected to the grip part (20) via a connecting element (14) and the grip part (20) is used to actuate the closure device (80). To this end, according to the invention the grip part (20) is composed of at least two parts, wherein a first part (21) is directly or indirectly mounted on the movable part (70) and a second part (22) is arranged movably on the first part (21), which forms an operating part (22) for operating the grip device (10).

15 Claims, 5 Drawing Sheets

Figure 1:
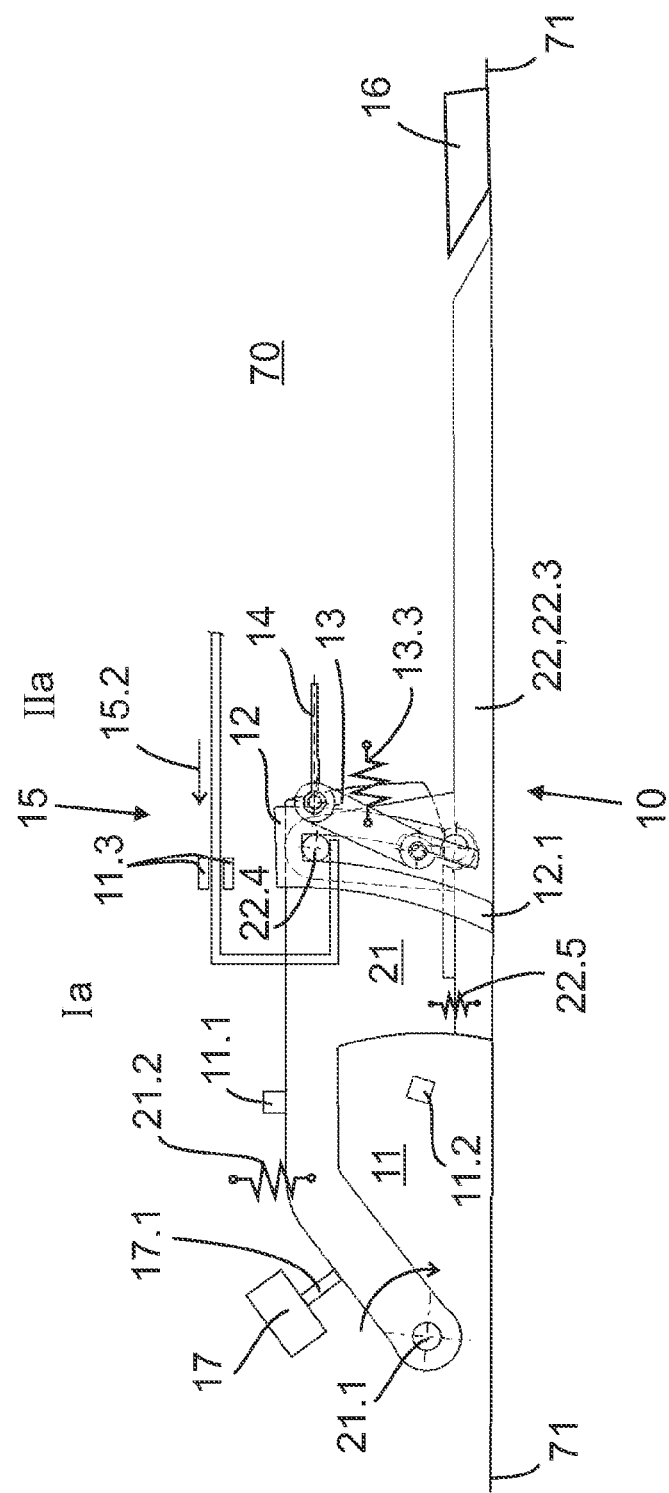

(51) Int. Cl.
*E05B 85/10* (2014.01)
*B60Q 1/26* (2006.01)

(56) References Cited

U.S. PATENT DOCUMENTS

| | | | |
|---|---|---|---|
| 5,632,516 A * | 5/1997 | Schwab | 292/336.3 |
| 5,681,068 A * | 10/1997 | Kleefeldt et al. | 292/336.3 |
| 6,095,573 A * | 8/2000 | Rozema | E05B 5/003 |
| | | | 292/336.3 |
| 6,447,030 B1 * | 9/2002 | Meinke | 292/347 |
| 6,698,262 B2 * | 3/2004 | Wittwer | 70/208 |
| 7,036,855 B2 * | 5/2006 | Lin et al. | 292/216 |
| 2004/0113439 A1 * | 6/2004 | Lin et al. | 292/216 |

FOREIGN PATENT DOCUMENTS

| | | |
|---|---|---|
| DE | 19731352 | 1/1999 |
| DE | 102004036663 A1 * | 3/2006 |
| DE | 10 2005 046119 A1 | 3/2007 |
| DE | 10 2006 023634 A1 | 11/2007 |
| DE | 10 2008 019335 A1 | 10/2008 |
| EP | 0 072 537 A1 | 2/1983 |
| EP | 1403453 A1 * | 3/2004 |
| JP | 58 121958 U | 8/1983 |
| WO | WO 2011/086144 A1 | 7/2011 |

OTHER PUBLICATIONS

Written Opinion, mailing date Aug. 31, 2011, for corresponding International Application No. PCT/EP2011/057562.

* cited by examiner

GRIP DEVICE, IN PARTICULAR FOR A VEHICLE

CROSS-REFERENCE TO RELATED APPLICATIONS

This application is a U.S. National Phase application, under U.S.C. §371, of International Application no. PCT/EP2011/057562, with an international filing date of May 10, 2011, and claims benefit of German Application no. 102010016869.6 filed on May 10, 2010, which are hereby incorporated by reference for all purposes.

The present invention relates to a grip device for a closure device for a movable part, such as a door, lid or the like, of a vehicle, according to the preamble of claim 1. This grip device comprises a grip part, which itself is mounted movably relative to the movable part, and wherein the closure device can be connected to the grip part via a connecting element and the grip part is used to actuate the closure device. It is thus possible to open or to close the movable part by using the grip device, which in turn acts on the closure device. The invention further relates to a method for actuating a grip device for a closure device for a movable part, such as a door, lid or the like, of a vehicle according to the preamble of claim 14.

Numerous generic grip devices are known from the prior art. For example, document DE 10 2005 046 119 A1 thus discloses a grip device comprising a movable grip part for a vehicle, wherein the movable grip part is a pull handle. This grip part is normally moved upon operation of the closure device, for example by a rotation or pivotal movement, so as to act mechanically or electromechanically on the closure device, which locks or releases the movable part. These grip devices have a relatively deep design, for which there has to be a corresponding amount of space available in the movable part. In addition, the grip part also protrudes relatively far from an outer face of the movable part, whereby the aerodynamics of a vehicle suffers and the accident risk with pedestrians is also increased.

A similar grip device is also disclosed in document DE 10 2006 023 634 A1, in which a pull handle is likewise formed as a grip part, wherein the operator of the grip part has to grasp between the grip part and the outer face of the movable part so as to pull the grip part out from the movable part, thus enabling an unlocking of the closure device. This grip device also protrudes considerably via the grip part, which is designed as a pull handle, from the outer face of the movable part.

The object of the present invention is therefore to provide a grip device for a closure device for a movable part, such as a door, lid or the like, in a vehicle, and to provide a method for actuating this grip device, wherein the grip device has a space-saving design of shallow depth and comfortable operation is nevertheless enabled. An additional object of the invention is to improve the aerodynamics with a grip device of this type and to reduce the accident risk, in particular for pedestrians.

The problem stated above is achieved by a grip device having the features from claim 1, in particular having the feature from the characterizing part. Preferred embodiments of the grip device according to the invention are disclosed in the dependent device claims. A method according to claim 14, in particular having the features from the characterizing part, is likewise proposed to achieve the problem stated above. Furthermore, variants of the method that are likewise preferred are described in the dependent method claims.

It should be mentioned at this juncture that all features from the grip device according to the invention can also be used in the method according to the invention for actuating a grip device. Likewise, all the features from the method according to the invention can be used in the grip device according to the invention. Within the context of this application, all features are thus transferrable from the device according to the invention to the method according to the invention, and vice versa.

The grip device according to the invention has a grip part, which is mounted movably relative to the movable part. The grip part can thus be arranged pivotably and/or rotatably relative to the movable part, wherein the movable part itself may be a door, lid, engine cowl or the like, of a vehicle. This movable part is locked or released by the closure device, depending on position, whereby the movable part itself can be opened or closed. The closure device itself can be connected via a connecting element to the grip part of the grip device, and the grip part is used to actuate the closure device. In accordance with the invention, the grip part is composed of at least two parts, wherein a first part is directly or indirectly mounted on the movable part and a second part is arranged movably on the first part, which forms an operating part for operating the grip device. The grip part itself therefore is not designed rigidly, but has two parts movable relative to one another. It is thus possible to obtain a particularly space-saving grip device, since the grip part itself can be designed very flat and does not have to protrude in a bothersome manner from the movable part, in particular from an outer face. The spatial requirement within the movable part is also much lower, since less space is required for the depth of the grip device and the grip part. The grip device according to the invention will always be described in the assembled state in the text below.

With the grip device according to the invention, the first part of the grip part may further be mounted on the movable part via a grip holder. The grip holder itself is thus used to receive and mount the grip part. Normally, the entire grip device is fastened to the movable part, in particular rigidly, via the grip holder, wherein the grip holder is arranged substantially on an inner face of the movable part. The first part of the grip part may have a center of rotation and/or a guide relative to the grip holder, whereby the movement between the grip part and the movable part can be achieved. Furthermore, the second part may have a center of rotation with the first part, whereby the second part is movable relative to the first part. It is also conceivable for the second part to be designed pivotably, and not just rotatably, relative to the first part. In this case, a fixed center of rotation is not provided, but rather a guide path between the second part and the first part of the grip part. A driver, for example which protrudes in a cam-like manner from the second part of the grip part, may also be provided on the second part, whereby the second part can act mechanically on the connecting element. As a result, the connecting element is actuated directly or indirectly by the second part of the grip part. The connecting element itself may consist of a Bowden cable, a connecting rod or push rod, or another mechanical element. It is also conceivable for the connecting element to consist of an electrical line, wherein the second part of the grip part sends a control signal via the connecting element to the closure device by means of an electrical component, for example a switch, button, sensor or the like.

Furthermore, a mechanical or electrical actuating element may be arranged between the connecting element and the second part of the grip part. In particular, the driver of the second part may act mechanically on the actuating element in this case. The mechanical actuating element itself can be designed as a lever, which is mounted rotatably or pivotably, in particular on the grip holder. As a result, the movement originating from the driver is used for the actuating element so as to transfer said movement from the actuating element to the connecting element. An electrical actuating element can convert a mechanical movement into an electrical signal, wherein the electrical actuating element itself can be designed as the aforementioned electrical component between the grip part and the connecting element.

The grip part may also have at least one rest position Ia and at least one operating position Ib, wherein the grip part on, or in, the movable part bears against a first stop in the rest position Ia and is arranged in particular with its second part, the operating part, substantially flush with an outer face of the movable part. In this case, the grip part may protrude in the operating position Ib via its second part from the outer face of the movable part, and the movable part can be opened by an actuation of the closure device. This embodiment of the grip device has the advantage that the grip part can be arranged in the movable part in the rest position Ia, such that the grip part basically does not protrude from the outer face of the movable part in the rest position Ia. Particularly good aerodynamics for a vehicle can thus be produced. Also, pedestrians cannot be injured by this grip part of this grip device, since it is arranged flush with the outer face of the movable part. The flush grip part thus constitutes a particularly advantageous variant of the grip device according to the invention.

Furthermore, with the grip device according to the invention the grip part may have at least two operating positions Ib and Ic, wherein, in a first operating position Ib, the second part is arranged in particular parallel to the outer face of the movable part, and wherein, in a second operating position Ic, the second part is disposed in particular at an incline to the outer face of the movable part, it being possible to act on the connecting element in this position. By contrast with the cited prior art, the grip device according to the invention thus has two different operating states Ib, Ic for the grip part, wherein the first operating position Ib (standby position) is comparable to a conventional door handle from the prior art. The closure device is actually actuated by changing the grip part from the first operating position Ib into the second operating position Ic (actuation position). In this case, the grip part, in particular the second part thereof, acts directly or indirectly via an actuating element on the connecting element, which is in contact with the closure device.

A guide, which is U-shaped in particular, may optionally be provided for example on the grip holder for the grip part or on the movable part itself and (the guide) cooperates mechanically with a guide cam on the second part, whereby the second part is movable relative to the first part when changing between the rest position Ia and the operating position Ib, Ic. The desired relative movement between the first part and the second part can thus be produced in a particularly elegant manner. The guide, which is U-shaped in particular, is expediently a component of the grip holder. The grip part can thus be mounted not only via a center of rotation with the grip holder, but additionally by the guide (which is U-shaped in particular). This guide may cooperate mechanically with the first and/or the second part of the grip part. By contrast, the previously mentioned center of rotation is only provided between the first part and the grip holder. At the same time, the mentioned guide cam on the second part of the grip part may also constitute the driver for the actuating element. The guide cam or the driver on the second part thus has two functions, namely the guiding function with the guide of the grip holder and the actuation function with the actuating element.

It is likewise conceivable that the actuating element is mounted on the grip holder, in particular on the guide for the second part of the grip part, and that, in particular, the driver of the second part of the grip part acts on the connecting element via the actuating element. In this case, the actuating element may be designed in a lever-like manner. The actuating element itself may have a center of rotation relative to the guide, which is U-shaped in particular, which belongs to the grip holder. It is also conceivable for the actuating element to be mounted rotatably and/or pivotably directly on the movable part. So as to design the (installation) depth of the grip device to be minimal, it is conceivable for the actuating element to be arranged substantially or completely above or below the guide and not to protrude depthwise beyond the grip part.

Furthermore, it is possible for an activating element to be provided, whereby the grip part can be transferred mechanically or electromechanically from its rest position Ia into its operating position Ib. This activating element is likewise expediently arranged flush on the movable part. In this case, the activating element is connected to the other grip device via the grip holder for example. If a mechanical activating element is used for the grip part, the grip part can be retracted or extended mechanically by the activating element. To this end, a rod assembly, Bowden cable or the like can be guided relative to the grip part by the activating element, whereby the grip part is movable between its rest position Ia and its operating position Ib. A drive, in particular in the form of an electric motor, servomotor or the like, may also optionally be provided for the grip part, whereby said grip part can be moved automatically between the rest position Ia and the operating position Ib, wherein, in particular, the drive is electrically actuatable via the activating element. A combination of a purely mechanical and electromechanical movement of the grip part when changing from the rest position Ia and the operating position Ib is also conceivable. For example, a spring can thus exert a tensile force or compressive force onto the grip part, whereby the grip part itself can be moved. The reverse direction against the spring force can be achieved for example purely mechanically by the operator of the grip device or by the aforementioned drive. Likewise, the drive can also cause a change from the rest position Ia into the operating position Ib and vice versa. The aforementioned spring for the grip part can cooperate with the first and/or the second part of the grip part as well as the grip holder. An additional spring may also be provided between the first and the second part of the grip part, whereby the guide cam of the second part can be arranged in constant contact with a flank, preferably a left-hand flank, of the U-shaped guide in the grip holder. The center between the two flanks of the U-shaped guide can be used as a stop for the grip part in the rest position Ia.

The guide, which is U-shaped in particular, has a left-hand flank and a right-hand flank, between which the guide cam or driver of the second part of the grip part can be guided with a positive fit. So that the driver can act mechanically on the connecting element, either directly or indirectly via the actuating element, the right-hand flank of the U-shaped guide is, for example, shorter than the left-hand flank. In the operating position Ib, the corresponding guide cam or driver of the second part of the grip part is released from the guide by the shorter right-hand flank, whereby the guide cam or driver can follow a movement of the second part of the grip part when said grip part is transferred from the first operating position Ib into the second operating position Ic. During this movement, the driver or the guide cam acts on the connecting element, either directly or indirectly via the actuating element, so as to actuate the closure device. The driver or the guide cam may be provided with a rotatably mounted roll so as to minimize the friction relative to the guide. It is further conceivable for the aforementioned guide to have just one guide flank (right-hand or left-hand), which cooperates mechanically with the guide cam or driver.

It is also conceivable that the actuating element is loaded by a spring, wherein this spring exerts a force onto the actuating element in the opposite direction to actuate the connecting element. As a result, the spring on the actuating element may be used to automatically restore the actuating element, if said actuating element has actuated the connecting element. This spring can be provided between the actuating element and the grip holder.

Furthermore, a barrier unit may optionally be provided in the grip device according to the invention, whereby the grip part is blocked in the rest position Ia, and wherein the barrier unit is actuatable in particular via the activating element. As a result of this additional barrier unit, it is possible for the grip device according to the invention to always remain in a locking position IIa if the grip part is located in its rest position Ia. It is thus possible to dispense with a further crash barrier for a side impact or other effective forces, since the barrier unit basically locks the grip device in the rest position Ia. By actuating the activating element, the barrier unit can be transferred from its locking position into a release position IIb, in which the grip part is completely movable. The barrier unit may itself have a rod assembly, which acts with a positive and/or non-positive fit on the grip part, in particular the first and/or the second part thereof. It is also conceivable for the barrier unit to cooperate with a non-positive and/or positive fit with the guide cam or the driver of the second part of the grip part.

Furthermore, the barrier unit may also be actuated electromechanically, wherein, in this case, the activating element only has to deliver a control signal for a corresponding drive of the barrier unit.

Furthermore, an electronics unit may be provided in the grip part, said electronics unit being connectable in particular to a security system on the vehicle and/or in particular having an illumination means. The security system may be an active or passive keyless entry system, a closure system or the like, which communicates electrically with the electronics unit in the grip part. The electronics unit may also have a proximity sensor or the like, whereby the approach or operation of an operator can be detected by means of measuring instruments. The electronics unit may also have an illumination means, whereby an illumination of the area to the fore thereof is conceivable. To this end, a transparent cover may be arranged in the grip part, in particular the second part, through which the light rays from the illumination means can pass so as to light up the area around the vehicle, at least in part.

The invention also relates to a method according to claim 14. The method according to the invention is used to actuate a grip device for a closure device for a movable part, such as a door, lid or the like, of a vehicle, comprising a grip part, which itself is mounted movably relative to the movable part, wherein the closure device is connected to the grip part via a connecting element and the grip part is used to actuate the closure device, and the grip part has at least one rest position Ia and at least one operating position Ib, wherein, in the rest position Ia, the operating part of the grip part is arranged substantially flush with an outer face of the movable part and is transferred into an operating position Ib when the grip device is activated, in particular via an activating element, wherein, in the operating position Ib, the operating part of the grip part protrudes from the outer face of the movable part. In accordance with the invention, the operating part (of the grip part) is in this case guided substantially parallel to the outer face of the movable part in the event of a change between the rest position Ia and the operating position Ib. The advantage with this method according to the invention lies in the fact that the grip part is arranged aerodynamically on the movable part in the rest position Ia and there is no risk of injury to pedestrians. In the operating position Ib, the risk of injury for an operator of the grip device is also particularly low, since the possibility of an operator's fingers being clamped in a scissor-like fashion when actuating the grip part is more or less ruled out, since said grip part is not guided at an incline, but parallel to the outer face of the movable part. The change between the rest position Ia and the operating position Ib may concern the transition from the rest position Ia into the operating position Ib and/or vice versa.

With the method according to the invention, the grip part may further be composed of at least two parts, wherein a first part is directly or indirectly mounted on the movable part, in particular via a grip holder, and a second part is arranged movably on the first part, which forms the operating part for operating the grip device, and wherein the two parts, namely the first and the second part of the grip part, can be moved from one another in a flexible manner in the event of a change between the rest position Ia and the operating position Ib. A relative movement between the first and the second part of the grip part can thus be implemented, whereby a risk of injury to an operator of the grip device can be reduced and effective protection against clamping is provided.

With the method according to the invention, the first part of the grip part may also be mounted on the movable part via a grip holder and may have a center of rotation relative to the grip holder. In this case, a guide for the operating part may be provided, which is arranged in particular on the grip holder, wherein the guide (which is U-shaped in particular) predefines the movement of the operating part in the event of a change between the rest position Ia and the operating position Ib.

With the method the grip part may also optionally have at least two operating positions Ib, Ic, wherein, in a first operating position Ib, the operating part is arranged parallel to the outer face of the movable part, and wherein the operating part, in a second operating position Ic, is arranged at an incline to the outer face of the movable part, the connecting element being acted on in this position, and wherein the operating part is moved in particular only in the event of a change between the first operating position Ib and the second operating position Ic. As a result, the first part of the grip part maintains its position during the aforementioned change between the first operating position Ib and the second operating position Ic. A second stop may be provided on the grip holder for this purpose, whereby the first grip part is held in the first operating position Ib.

It should again be mentioned at this juncture that the method according to the invention can also be carried out with the grip device according to the invention. The grip device according to the invention may also be used to carry out the method according to the invention.

Figure 2:
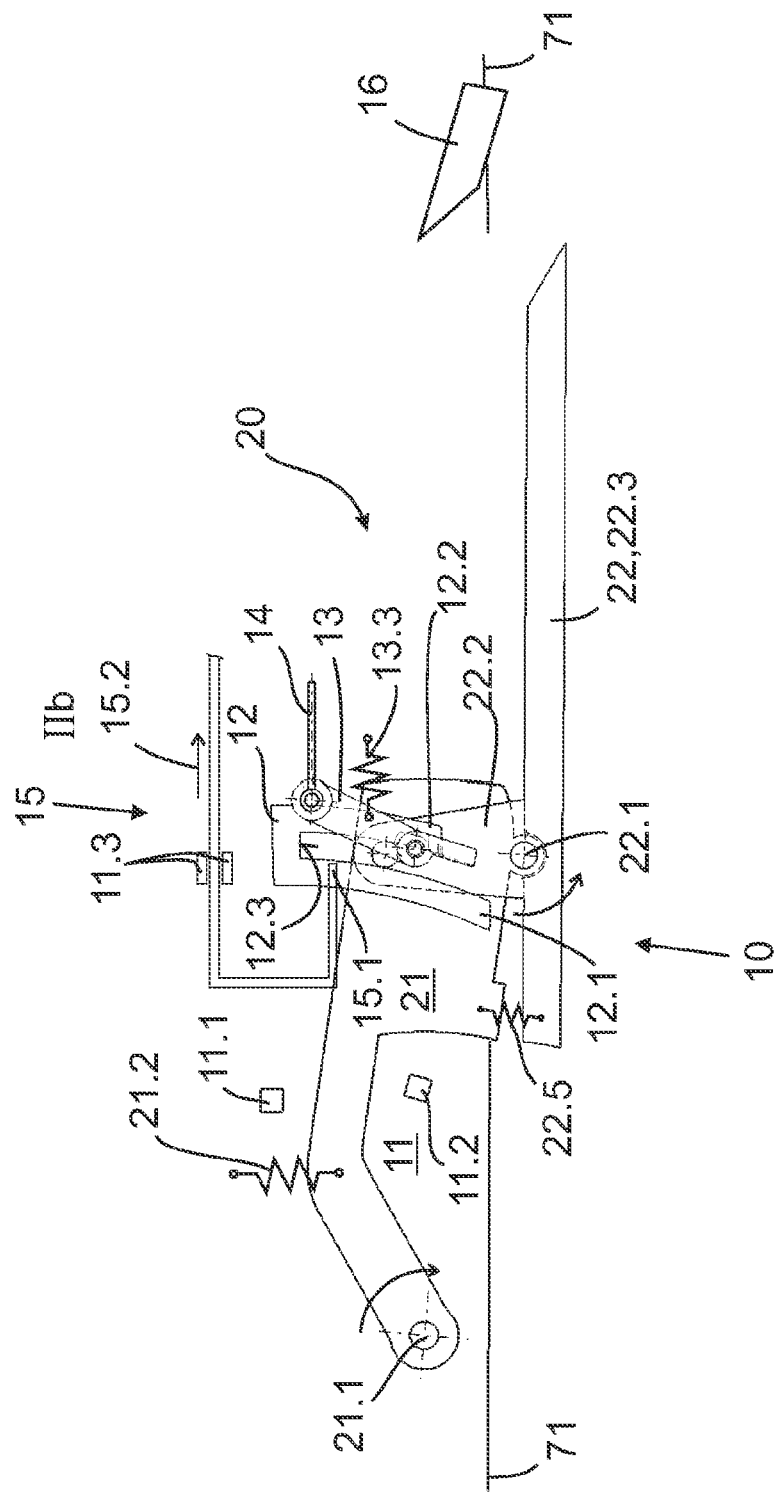
Figure 3:
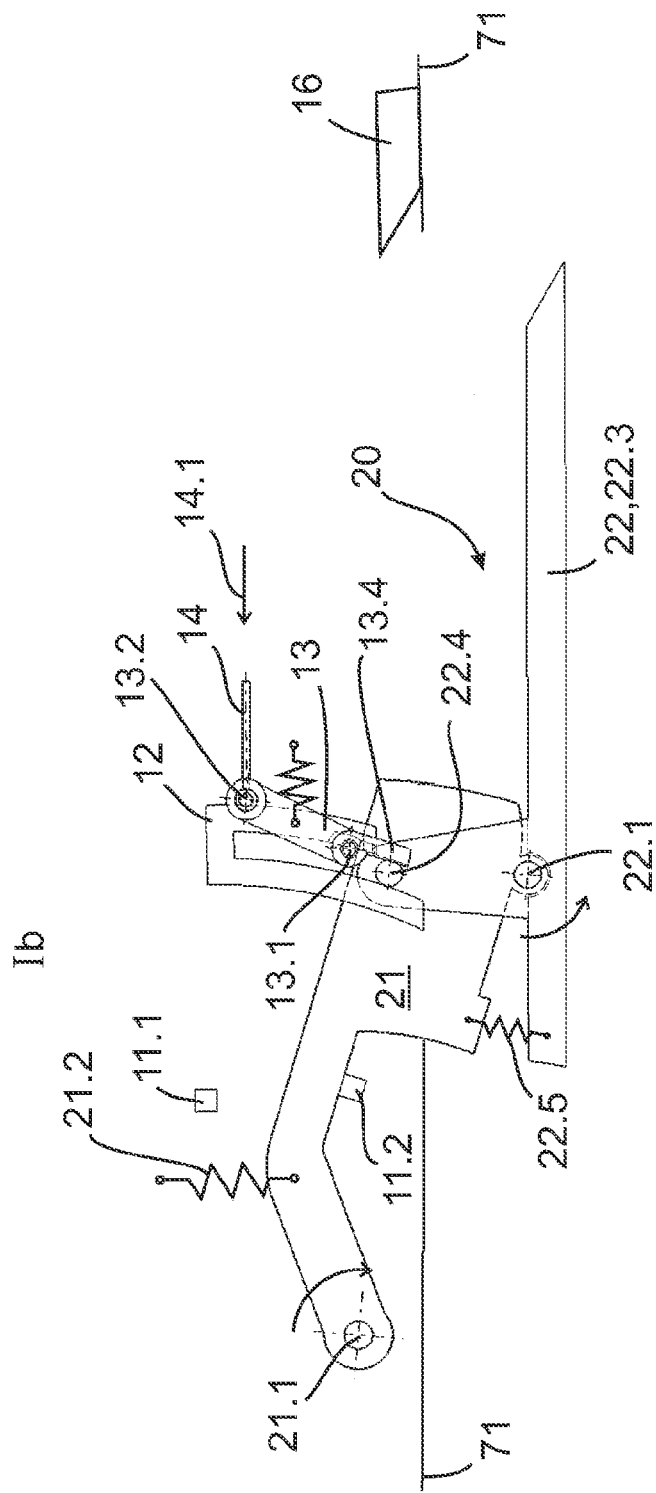
Figure 4:
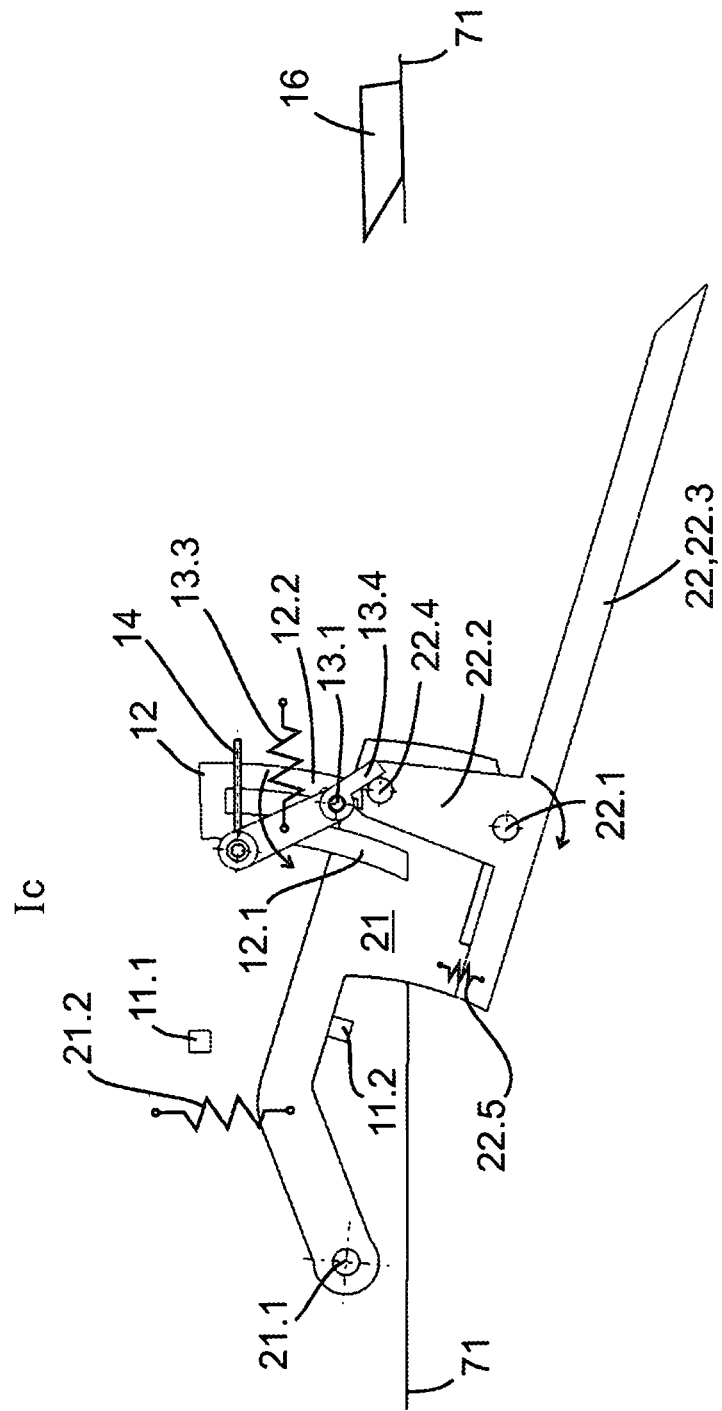
Figure 5:
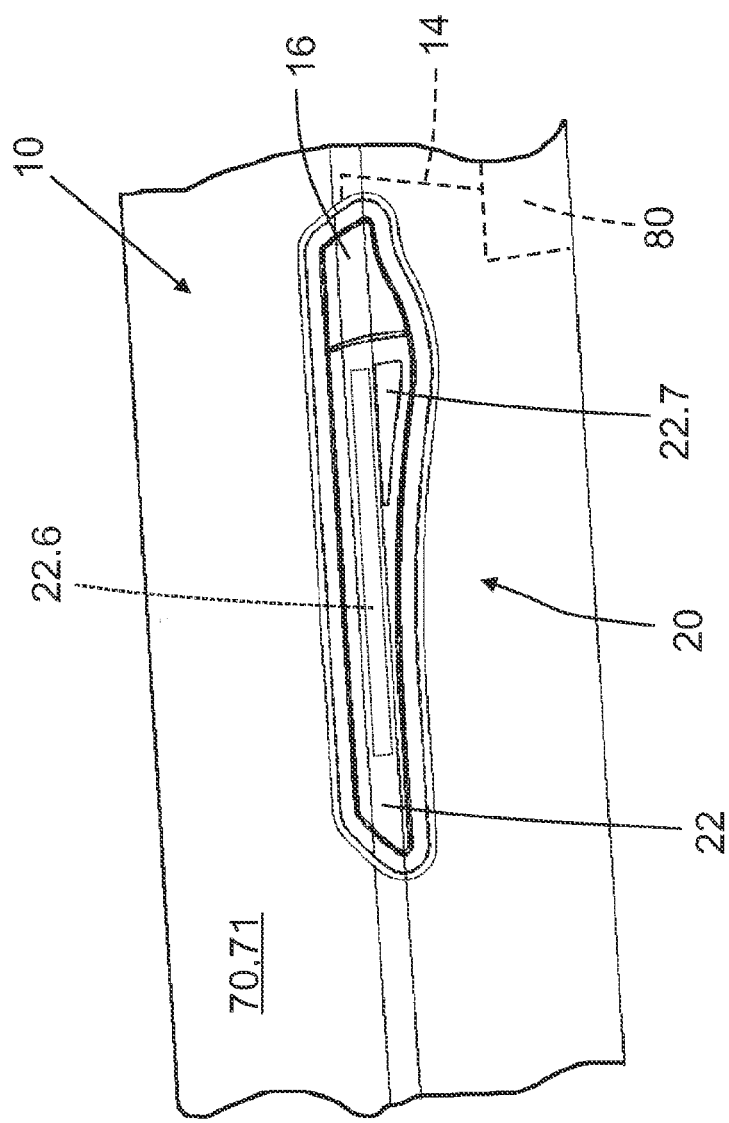

Further advantageous measures and features of the invention will become clear from the following description and from the illustrated figures. The invention is illustrated in a number of exemplary embodiments in the figures, in which:

FIG. 1 shows a schematic cross section through a grip device according to the invention in a rest position Ia with a barrier unit in a locking position IIa, FIG. 2 shows a schematic cross section through a similar grip device from FIG. 1 in an intermediate position and with a barrier unit in a release position IIb, FIG. 3 shows a schematic cross section through a further grip device according to the invention in a first operating position Ib (standby position), FIG. 4 shows a schematic cross section through the grip device from FIG. 3 in a second operating position Ic (actuation position), and FIG. 5 shows a plan view of a grip device according to the invention in a movable part in the rest position Ia.

A cross section through the grip device 10 according to the invention in the rest position Ia is illustrated schematically in FIG. 1. The grip device 10 is fastened via a grip holder 11 to the movable part 70 of a vehicle. The movable part 70 may itself be a door, lid, engine cowl or the like. This movable part 70 is closed by a closure device 80. So as to open the movable part 70, the closure device 80 must release the movable part 70, wherein it has to be actuated by the grip device 10. A closure device 80 of this type, which is connected via a connecting element 14 to the grip device 10, is indicated in FIG. 5.

As can also be seen from FIG. 1, a grip part 20 of the grip device 10 does not protrude from an outer face 71 of the movable part 70 in the rest position Ia, but is instead arranged flush with the outer face 71. In this rest position Ia, the grip part 20 is more or less inaccessible to an operator. So that actuation of the grip device 10 is possible, however, an activating element 16 is provided for example, which is provided beside the grip part 20 in the extension thereof. As a result of the activating element 16, the grip part 20 can be transferred from its rest position Ia into its first operating position Ib (standby position). This operating position Ib is illustrated in FIG. 3. As can be seen further from FIG. 1, the grip part 20 is formed of two parts, namely from a first part 21 and a second part 22, wherein the second part 22 is connected to the first part 21 via a rotary connection having a center of rotation 22.1. The first part 21 has a center of rotation 21.1 relative to the grip holder 11, whereby it can be mounted rotatably thereon. So that the grip part 20 occupies a defined rest position Ia, a first stop 11.1 is additionally provided on the grip holder 11 and cooperates mechanically with the first part 21. For the operating position Ib of the grip part 20, a second stop 11.2 is provided on the grip holder 11 and likewise cooperates with the first part 21 of the grip part 20. The first part 21 therefore cannot be rotated out beyond the second stop 11.2.

In the present case, the second part 22 is arranged rotatably on the first part 21 and, to this end, has the center of rotation 22.1. The second part 22 is substantially T-shaped (or else just L-shaped), wherein it has a main part 22.3, which remains flush with the outer face 71 in the rest position Ia on the movable part 70. A lever-shaped extension 22.2 proceeds from the main part 22.3 (almost perpendicularly) and can be arranged above and/or beneath the first part 21 of the grip part 20. The lever-shaped extension 22.2 may thus encompass the first part 21 in a U-shaped manner. The center of rotation 22.1 is provided at the connection point between the main part 22.3 and the lever-shaped extension 22.2. In the rest position Ia, the T-shaped second part 22 has a further contact point or stop point relative to the first part 21, namely in the region of a spring 22.5, which is arranged between the first part 21 and the second part 22. This region around the spring 22.5 (to the left beside the center of rotation 22.1) is designed as a stop face at the first part 21 and at the second part 22 so as to thus achieve a clearly predefined rest position Ia of the grip part 20.

Furthermore, a barrier unit 15 is provided on the grip device 10 from FIG. 1 and is arranged in its locking position IIa and blocks the grip part 20 against collision forces or the like. The barrier unit 15 may likewise be actuated or unlocked by the activating element 16, which is provided so as to transfer the grip part 20 from the rest position Ia into the first operating position Ib. In FIG. 1, the activating element 16 is likewise arranged flush with the outer face 71 of the movable part 70. Since the barrier unit 15 locks the grip part 20 in the locking position IIa, an effective tip 15.1 of the barrier unit 15 acts mechanically on the grip part 20. In the present case, a driver 22.4 on the lever-shaped extension 22.2 of the second part 22 of the grip part 20 is blocked with a positive fit in a U-shaped guide 12 by the effective tip 15.1 of the barrier unit 15. Only when the barrier unit 15 releases the positive fit between the effective tip 15.1 and the driver 22.4 is movement of the grip part 20 possible. To this end, a displacement of the barrier unit 15 in the direction of the arrow 15.2 is necessary. The barrier unit 15 may itself consist substantially of a rod or a movable bar, which forms the effective tip 15.1. For a rod-shaped barrier unit 15, a bearing 11.3 may be provided on the grip holder 11, in which the barrier unit 15 is mounted in a longitudinally displaceable manner.

As can be easily seen from FIGS. 1 to 4, the grip device 10 has just a shallow (installation) depth, and therefore requires only a small amount of space, for example as is provided at very thin points of the movable part 70. So that the flat construction of the grip device 10 is supported, the provided actuating element 13 is mounted rotatably above the grip part 20 on the U-shaped guide 12. The actuating element 13 is lever-shaped, wherein the lever turns about its center of rotation 13.1 (see FIG. 4). It should be mentioned here that merely a right-hand guide flank 12.1 (or left-hand guide flank 12.2 depending on a right-hand or left-hand grip device 10) may be provided instead of the U-shaped guide 12 so as to mount the grip part 20.

A drive 17 comprising a drive rod 17.1 for electromechanical actuation of the grip part 20 is further optionally illustrated in FIG. 1. As a result of this drive 17, it is possible for the grip part 20 to be automatically transferred between its rest position Ia and its first operating position Ib. In addition, a spring 21.2 is conceivable, which engages on the grip part 20, in particular the first part 21, and also on the grip holder 11. This spring 21.2 can also ensure an automatic change between the rest position Ia and the first operating position Ib of the grip part 20.

A very similar grip device 10 from FIG. 1 is illustrated schematically in cross section in FIG. 2. With this grip device 10, the optional drive 17 has been omitted. The grip part 20 is located in an intermediate position between the rest position Ia and the first operating position Ib. As a result, it rests neither against the first stop 11.1 nor against the second stop 11.2 of the grip holder 11. It can be clearly seen, however, that a relative movement has already been executed between the first part 21 and the second part 22 of the grip part 20, since a gap has formed in the region of the spring 22.5. This gap forms as a result of the rotation of the second part 22 relative to the first part 21. The rotation is caused by the cooperation of a guide cam 22.4 with the U-shaped guide 12. The guide cam 22.4 is used simultaneously as a driver 22.4 for the actuating element 13 and, as already mentioned, is arranged on the lever-like extension 22.2 of the second part 22 of the grip part 20. Once the activating element 16 has been actuated, for example by a pressure, this rotary movement is used to release the barrier unit 15, which is displaced in the direction of the arrow 15.1 from FIG. 1. In FIG. 2, the barrier unit 15 is illustrated in the release position IIb. In this case, the positive fit between the effective tip 15.1 and the driver 22.4 of the second part 22 is cancelled, whereby the grip part 20 is mounted in a freely movable manner in the grip holder 11. The pressure on the activating element 16 can likewise be used to generate a movement of the grip part 20. To this end, a rod assembly or the like may be provided, which is not illustrated in the figures however. As a result of this rod assembly or the spring 21.2, the first part 21 of the grip part 20 is turned in a clockwise direction about the center of rotation 21.1. As a result of this rotation, the second part 22 is also moved at the same time, wherein said second part is additionally rotated about the center of rotation 22.1 in an anticlockwise direction relative to the first part 21 by the guide 12 and the guide cam 22.4 arranged therein with a positive fit. In this case, the guide cam 22.4 slides along from a stop center 12.3 in the U-shaped guide 12, in particular over the left-hand flank 12.1. The grip part 20 therefore does not protrude at an incline from the outer face 71 of the movable part 70, but substantially parallel to the outer face 71.

If the grip part 20 is transferred back into the rest position Ia from FIG. 1, the barrier unit 15 has to be moved in the direction of the arrow 15.2 from FIG. 2 so as to lock the grip part 20.

In FIG. 3, the grip part 20 has reached its first operating position Ib and rests via the first part 21 against the second stop 11.2. The second part 22 likewise has a maximum angle of rotation relative to the first part 21 of the grip part 20. In FIG. 3 the maximum gap in the region of the spring 22.5 between the first part 21 and the second part 22 of the grip part 20 is thus illustrated. To reach the first operating position Ib, the second part 22 was turned further in an anticlockwise direction about the center of rotation 22.1. This rotation is caused by the guide cam 22.4 of the second part 22 in the guide 12. In this case, the guide cam 22.4 slides substantially over the left-hand flank 12.1 of the guide 12. The spring 22.5 between the first part 21 and the second part 22 of the grip part 20 supports the guide cam 22.4 as it slides along over the left-hand flank 12.1 of the U-shaped guide 12. As can also be seen in FIG. 3, the guide cam 22.4 rests more or less against the left-hand flank 12.1, wherein the right-hand flank 12.2 ends at this height so that contact between the guide cam 22.4 and the right-hand flank 12.2 is ruled out in the first operating position Ib. The activating element 16 may again be arranged flush with the outer face 71 of the movable part 70 in the first operating position Ib, or may remain in the operating position as in FIG. 2.

As can be seen in FIGS. 1 to 3, the actuating element 13 is always illustrated in the same position, since it has not previously been moved or changed by the movement of the grip part 20 from the rest position Ia into the first operating position Ib. In FIGS. 1 to 3 there is thus also no actuation of the closure device 80 via the connecting element 14, which in the present case is designed as a Bowden cable or connecting rod. The grip device 10 is actually actuated when the grip part 20 changes from the first operating position Ib to the second operating position Ic (actuation position). In this case, the connecting element 14 exerts a tensile force in the direction of the movement arrow 14.1.

In FIG. 4, the grip part 20 is now illustrated in the second operating position Ic, in which the closure device 80 is actuated via the connecting element 14. In this case, the grip part 20, in particular by means of the second part 22, acts on the connecting element 14 via the actuating element 13. This tensile force is transferred via the connecting element 14 to the closure device 80. As can be seen in FIG. 4, the actuating element 13 has been rotated in an anticlockwise direction about its center of rotation 13.1. Here, a tensile force by an operator at the second part 22 of the grip part 20 from the outer face 71 of the movable part 70 ensures a path for a rotary movement of the second part 22 in a clockwise direction about the center of rotation 22.1 with the first part 21 of the grip part 20. This rotary movement causes the guide cam 22.4 or the driver 22.4 on the second part 22 to leave the left-hand flank 12.1 of the guide 12 and to exert a compressive force on an actuation end 13.4 of the actuating element 13, whereby said actuating element is turned in an anticlockwise direction about the corresponding center of rotation 13.1. The desired tensile force is thus generated at the connecting element 14, which engages at the other end of the actuating element 13, namely the bearing point 13.2 for the connecting element 14. The center of rotation 13.1 of the actuating element 13 lies between the bearing point 13.2 for the connecting element 14 and the actuation end 13.4 for the driver 22.4. In addition, a spring 13.3 is provided, which engages the actuating element 13 on the one hand and the grip holder 11 on the other hand. This spring 13.3 is used to automatically restore the actuating element 13 from FIGS. 1 to 3. In addition, the operating part 22 of the grip part 20 can again also be transferred into the operating position Ib as a result of the spring 13.3, wherein the driver 22.4 again comes to rest against the left-hand flank 12.1 of the guide 12.

As can be seen, clearly in FIG. 4, the operating part 22, which is formed by the second part 22 of the grip part 20, is now arranged at an incline to the outer face 71 of the movable part 70. In this second operating position Ic, the closure device 80 releases the movable part 70, whereby said movable part can be opened, for example so as to enter the passenger compartment through the door in the case of a vehicle. The entire process during which the grip part 20 changes from the second operating position Ic to the rest position Ia can be implemented by the spring 21.2 and/or the spring 13.3, if these are designed as tension springs in the present case. The drive 17 from FIG. 1 can also be used for this purpose if the grip device 10 is electromechanically actuatable.

A plan view of a grip device 10 according to the invention is illustrated in FIG. 5. In this case, the grip device 10 is arranged flush with the outer face 71 of the movable part 70 or the side door. In this plan view only the operating part 22 of the grip part 20 is visible. The first part 21 of the grip part 20 is located behind the operating part 22 and cannot be seen. With this grip device 10, an electronics unit 22.6 is illustrated by means of a dashed line and is arranged on, or in, the first part 21 and/or second part 22 of the grip part 20 so as not to be visible. In addition, an illumination means is provided in the grip part 20, wherein the light beams can exit through a cover 22.7 on the second part 22. The activating element 16 for the flush grip device 10 is arranged to the right next to the operating part 22 and constitutes an extension thereof. The connecting element 14 is likewise illustrated by means of a dashed line between the grip device 10 and the closure device 80, which are arranged on the movable part 70, behind the outer face 71 so as not to be visible.

LIST OF REFERENCE SIGNS 10 grip device
11 grip holder
11.1 first stop for 21 (rest position)
11.2 second stop for 22 (operating position)
11.3 bearing for 15
12 guide for 22, in particular U-shaped
12.1 left-hand flank
12.2 right-hand flank
12.3 stop center
13 actuating element/lever
13.1 center of rotation of 13
13.2 bearing point for 14
13.3 spring (between 11/13)

13.4 actuation end
14 connecting element, in particular Bowden cable or the like
14.1 arrow for direction of movement of 14
15 barrier unit
15.1 effective tip
15.2 arrow for direction of movement of 15
16 activating element
17 drive
17.1 drive rod
20 grip part
21 first part
21.1 center of rotation of 21
21.2 spring (between 11/21)
22 second part/operating part
22.1 center of rotation of 22
22.2 lever-shaped extension
22.3 main part of 22
22.4 guide cam/driver (cam-shaped)
22.5 spring (between 21/22)
22.6 electronics unit
22.7 cover (for example illumination means)
70 movable part
71 outer face
80 closure device for 70
Grip Part:
Ia rest position
Ib first operating position (standby position)
Ic second operating position (actuation position)
Barrier Unit:
IIa locking position
IIb release position

The invention claimed is:

1. A grip device (10) for a closure device (80) for a movable part (70) of a vehicle, comprising:
    a grip part (20), which is mounted movably relative to the movable part (70), wherein the closure device can be connected to the grip part (20) via a connecting element (14) and the grip part (20) is used to actuate the closure device (80),
    characterized in that the grip part (20) is composed of at least two parts, wherein a first part (21) is directly or indirectly mounted on the movable part (70) and a second part (22) having a first end and a second end, is arranged movably on the first part (21) near the first end, which forms an operating part (22) for operating the grip device (10), wherein the second end being a free end from the movable part (70), and the at least two parts are movable relative to one another;
    wherein the grip part (20) has at least one rest position (Ia) and at least two operating positions (Ib, Ic);
    wherein the grip part (20) on the movable part (70) bears against a first stop (11.1) in the rest position (Ia) and is arranged in particular with the second part (22), the operating part (22), substantially flush with an outer face (71) of the movable part (70);
    wherein, in a first operating position (Ib), the second part (22) is arranged in particular parallel to the outer face (71) of the movable part (70);
    wherein, in a second operating position (Ic), the second part (22) is disposed in particular at an incline to the outer face (71) of the movable part (70), the second part being possible to act on the connecting element (14) in this position; and
    wherein the grip part (20) is arranged in the second operating position (Ic) only after first being arranged in the first operating position (Ib).

2. The grip device (10) as claimed in claim 1, characterized in that
    the first part (21) of the grip part (20) is mounted on the movable part (70) via a grip holder (11), and in particular has a center of rotation (21.1) and/or a guide relative to the grip holder (11).

3. The grip device (10) as claimed in claim 1, characterized in that
    the second part (22) has a center of rotation (22.1) with the first part (21), and in particular a driver is provided, whereby the second part (22) acts mechanically on the connecting element (14).

4. The grip device (10) as claimed in claim 2, characterized in that
    the second part (22) has a center of rotation (22.1) with the first part (21), and in particular a driver is provided, whereby the second part (22) acts mechanically on the connecting element (14).

5. The grip device (10) as claimed in claim 1, characterized in that
    an actuating element (13) is arranged between the connecting element (14) and the second part (22) of the grip part (20), wherein in particular a driver (22.4) is provided on the second part (22) which acts mechanically on the actuating element (13).

6. The grip device (10) as claimed in claim 5, characterized in that
    the actuating element (13) is mounted on a grip holder (11), in particular on a guide (12) provided on the grip holder for the second part (22) of the grip part (20), and in that, in particular, the driver (22.4) of the second part (22) of the grip part (20) acts on the connecting element (14) via the actuating element (13), wherein the actuating element (13) is designed as a lever in particular.

7. The grip device (10) as claimed in claim 5, characterized in that
    the first and/or second part (21, 22) of the grip part (20) is/are acted on by a spring (21.2, 22.5) and/or the actuating element (13) is loaded by a spring (13.3).

8. The grip device (10) as claimed in claim 1, characterized in that
    a guide (12), which is U-shaped or one-sided in particular, is provided on a grip holder (11) for the grip part (20) and cooperates mechanically with a guide cam (22.4) on the second part (22), whereby the second part (22) is movable relative to the first part (21) when changing between the rest position (Ia) and the first and second operating positions (Ib, Ic).

9. The grip device (10) as claimed in claim 1, characterized in that
    an activating element (16) is provided, whereby the grip part (20) can be transferred mechanically or electromechanically from the rest position (Ia) into the first operating position (Ib).

10. The grip device (10) as claimed in claim 9, characterized in that
    a drive (17) is provided for the grip part (20), whereby said grip part can be moved automatically between the rest position (Ia) and the first operating position (Ib), wherein, in particular, the drive (17) is actuatable via the activating element (16).

11. The grip device (10) as claimed in claim 10, characterized in that
    a barrier unit (15) is provided, whereby the grip part (20) is blocked in the rest position (Ia), and wherein the barrier unit (15) is actuatable in particular via the activating element (16).

12. The grip device (10) as claimed in claim 1, characterized in that
an electronics unit (22.6) is provided in the grip part (20), said electronics unit being connectable in particular to a security system on the vehicle and/or in particular having an illumination means.

13. A method for actuating a grip device (10) for a closure device (80) for a movable part (70) of a vehicle, the grip device comprising: a grip part (20), which is mounted movably relative to the movable part (70), the grip part (20) is composed of at least two parts, wherein a first part (21) is directly or indirectly mounted on the movable part (70), and a second part (22) having a first end and a second end, is arranged movably on the first part (21) near the first end, which forms an operating part (22) for operating the grip device (10), and wherein the second end being a free end from the movable part (70), and the at least two parts are movable relative to one another, wherein the closure device (80) is connected to the grip part (20) via a connecting element (14) and the grip part (20) is used to actuate the closure device (80), and the grip part (20) has at least one rest position (Ia) and at least two operating positions (Ib, Ic),
the method comprising: wherein, in the rest position (Ia), arranging the operating part (22) of the grip part (20) substantially flush with an outer face (71) of the movable part (70) and transferring the operating part into a first operating position (Ib) when the grip device (10) is activated,
wherein, in the first operating position (Ib), the operating part (22) is arranged parallel to the outer face (71) of the movable part (70);
wherein the operating part (22), in a second operating position (Ic), is arranged at an incline to the outer face (71) of the movable part (70), the connecting element (14) being acted on in this position; and
wherein the operating part (22) is arranged in the second operating position (Ic) only after first being arranged in the first operating position (Ib).

14. The method as claimed in claim 13, characterized in that
the two parts (21, 22) are movable from one another in a flexible manner in the event of a change between the rest position (Ia) and the first operating position (Ib).

15. The method as claimed in claim 14, characterized in that
the first part (21) of the grip part (20) is mounted on the movable part (70) via a grip holder (11) and has a center of rotation (21.1) relative to the grip holder (11),
and in that a guide (12) for the operating part (22) is provided, which is arranged in particular on the grip holder (11), wherein the guide (12) predefines the movement of the operating part in the event of a change between the rest position (Ia) and the first operating position (Ib).

* * * * *